(12) United States Patent
Chakrabarti et al.

(10) Patent No.: US 9,040,624 B2
(45) Date of Patent: May 26, 2015

(54) LOW VOC COLORANTS WITH NON TIP DRYING

(75) Inventors: Nilanjan Chakrabarti, Middletown, DE (US); Lee E. Young, Brownstown, MI (US); Nancy Almasarweh, Sterling Heights, MI (US); Shakera Thamanna, Hamtramck, MI (US); Christopher Flanders, Solon, OH (US); William M. Wunch, Cleveland, OH (US); Amrit P. Bindra, Brecksville, OH (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/380,229

(22) PCT Filed: Oct. 1, 2009

(86) PCT No.: PCT/US2009/059148
§ 371 (c)(1),
(2), (4) Date: Dec. 22, 2011

(87) PCT Pub. No.: WO2011/002474
PCT Pub. Date: Jan. 6, 2011

(65) Prior Publication Data
US 2012/0095128 A1      Apr. 19, 2012

Related U.S. Application Data

(60) Provisional application No. 61/222,731, filed on Jul. 2, 2009.

(51) Int. Cl.
  *C08G 69/26*    (2006.01)
  *C09D 17/00*    (2006.01)
  *C09D 7/02*     (2006.01)

(52) U.S. Cl.
  CPC ............... *C09D 17/001* (2013.01); *C09D 7/02* (2013.01)

(58) Field of Classification Search
None
See application file for complete search history.

(56) References Cited

U.S. PATENT DOCUMENTS

| | | | | |
|---|---|---|---|---|
| 3,703,535 A | * | 11/1972 | Mannheimer | 554/48 |
| 3,953,218 A | * | 4/1976 | Pollard | 106/504 |
| 4,909,852 A | | 3/1990 | Atkinson | |
| 5,034,508 A | * | 7/1991 | Nishizaki et al. | 528/408 |
| 5,153,069 A | * | 10/1992 | Canestri | 428/407 |
| 5,340,394 A | | 8/1994 | Elsamanoudi | |
| 5,897,698 A | | 4/1999 | Bellas | |
| 5,934,513 A | | 8/1999 | Bellas | |
| 6,287,377 B1 | | 9/2001 | Binns et al. | |
| 6,488,760 B1 | | 12/2002 | Binns et al. | |
| 6,638,349 B2 | * | 10/2003 | Atkinson | 106/18.32 |
| 7,259,195 B2 | * | 8/2007 | El-Shoubary et al. | 523/205 |
| 2006/0207476 A1 | * | 9/2006 | Coward et al. | 106/447 |
| 2011/0120346 A1 | * | 5/2011 | Reisacher et al. | 106/499 |

FOREIGN PATENT DOCUMENTS

| | | | |
|---|---|---|---|
| EP | 0 877 063 | | 11/1998 |
| EP | 08161328.3 | * | 7/2008 |
| GB | 828665 | * | 2/1960 |
| JP | 2006-016546 | * | 1/2006 |
| WO | 96/26986 | | 9/1996 |
| WO | 2006/102011 | | 9/2006 |

OTHER PUBLICATIONS

English translation of Yamawaki, JP 2006-016546, Jan. 2006.*
IUPAC definition of Alkyl, PAC, 1995, 67, 1307, (Glossary of class names of organic compounds and reactivity intermediates based on structure (IUPAC Recommendations 1995)), p. 1314.*
IUPAC definition of Aryl, PAC, 1995, 67, 1307 (Glossary of class names of organic compounds and reactivity intermediates based on structure (IUPAC Recommendations 1995)), p. 1320.*
Product Information Sheet for Dextrol OC-50, No. 4399-2, Ashland Specialty Ingredients, pp. 1-2.*
International Search Report issued on Feb. 23, 2010 in International PCT Application No. PCT/US2009/059148 filed Oct. 1, 2009.
International Preliminary Report on Patentability issued Jan. 4, 2012 for International Patent Application PCT/US09/59148, filed Oct. 1, 2009.
Communication dated May 14, 2014 for European Patent Application No. 2009793219.

* cited by examiner

*Primary Examiner* — Susannah Chung
*Assistant Examiner* — Robert T Butcher
(74) *Attorney, Agent, or Firm* — Drinker Biddle & Reath LLP

(57) ABSTRACT

A colorant composition for tinting or coloring surface coverings or paint is. provided that has a low volatile organic compound (VOC) concentration, alkylphenoi ethoxylate surfactants (APE) free and hazardous air pollutants (HAPS) free. Additionally, the colorant composition has performance properties substantially equal to or better than tinters possessing high VOC concentrations. The colorant composition includes a colorant component, a dispersant including a polyamide, a surface active agent, water, and optional additives, The polyamide is a high molecular weight polyamide-.having at least two anchoring amines, and the surface active agent includes phosphoric acid, phosphate esters, or salts thereof.

17 Claims, 10 Drawing Sheets

LOW VOC COLORANTS WITH NON TIP DRYING

CROSS-REFERENCE TO PRIOR APPLICATION

This application is a National Stage of International Application No. PCT/US2009/059148 filed Oct. 1, 2009, which claims priority from U.S. Provisional Application No. 61/222,731 filed Jul. 2, 2009. The entire content of both are incorporated herein by reference.

TECHNICAL FIELD

The present disclosure relates generally to low volatile organic compound (VOC) point-of-sale colorants for use in architectural or decorative coatings, for example, alkyd-based and latex-based paints.

BACKGROUND

Architectural coatings or decorative coatings include house paints for both interior and exterior applications. Such paints have been used over the years for protective and decorative purposes. The paints are used to protect the substrate on which the paint is applied from light, heat and corrosion. The functional purpose of the paint includes its ability to fill and protect the irregularities of the surface it protects. Most paints are made up of four basic groups of raw materials: 1) binders or resins; 2) tinters (pigments and/or colorants); 3) solvents; and 4) additives. When a paint is applied to a surface, the solvents evaporate while the binder, pigments and additives remain on the surface to form a protective dry solid film.

Up until the 1940's, paints were almost all solvent based. Now in the early 21st century, more than 70% of the architectural coatings market is water-based paints due to its comparable performance and the environmental regulations in the United States. Universal colorants are desired because they are compatible in both solvent-based alkyd as well as water-based acrylic latex emulsions. Colorants are used in architectural coatings not only for appearance, but also for further performance parameters including gloss, weatherability, and hiding properties. Many of these parameters have been improved by use of colorants containing volatile organic compounds (VOCs).

Focus on VOCs of the paints by the consumers and the various regulatory agencies at both the federal and the state level has resulted in the awareness of the benefits of low VOC colorants in the tinters of the paints. In addition to VOCs, regulatory agencies, such as the EPA, regulate hazardous air pollutants (HAPS), which include alkylphenol ethoxylate surfactants (APE). APE has been used in paints as a wetting agent and also for pigment dispersion and temporarily stabilizing the pigment dispersion from re-aggregating and re-agglomerating.

Universal colorant compositions are described for example in WO-A 2006/102 011. Pigment dispersions in universal applications are described in U.S. Pat. Nos. 5,934,513, 5,897,698, 5,340,394 and 6,287,377.

Despite the fact that the universal colorant compositions have been known for some time, and some even attempting to have low VOC levels, there is still a great need for ultra low VOC universal colorant compositions with exceptional coating applications which match or exceed the performance of current regular VOC universal colorants.

SUMMARY

Thus, it is desired to have colorant compositions with desired coloristic properties that are economically friendly, but also include high levels of non-tip drying, gloss, and viscosity. Such a colorant composition could be used in tinting decorative coatings. Further, such a colorant composition can be used in a dispensing machine to tint decorative coatings at point-of-sale.

An exemplary colorant composition comprises a colorant component, a dispersant including a polyamide including at least two amino anchoring groups, a surface active agent, and water. Optionally, the colorant composition comprises one or more additives.

According to at least one embodiment, colorant composition comprises from about 5% to about 70% by weight pigment, from about 1% to about 30% by weight dispersant including a polyamide including at least two amino anchoring groups, from about 0.1% to about 30% by weight surface active agent including a phosphate ester, residual alcohol, or phosphoric acid, and about 1 to about 75% by weight water.

It is to be understood that both the foregoing general description and the following detailed description are exemplary and explanatory and are intended to provide further explanation of the materials, compositions, and methods described above.

BRIEF DESCRIPTION OF THE DRAWINGS

The following detailed description can be read in connection with the accompanying drawings in which like numerals designate like elements and in which "APEO" is an alternative abbreviation for alkylphenol ethoxylate.

DETAILED DESCRIPTION

Definitions

Figure 1:
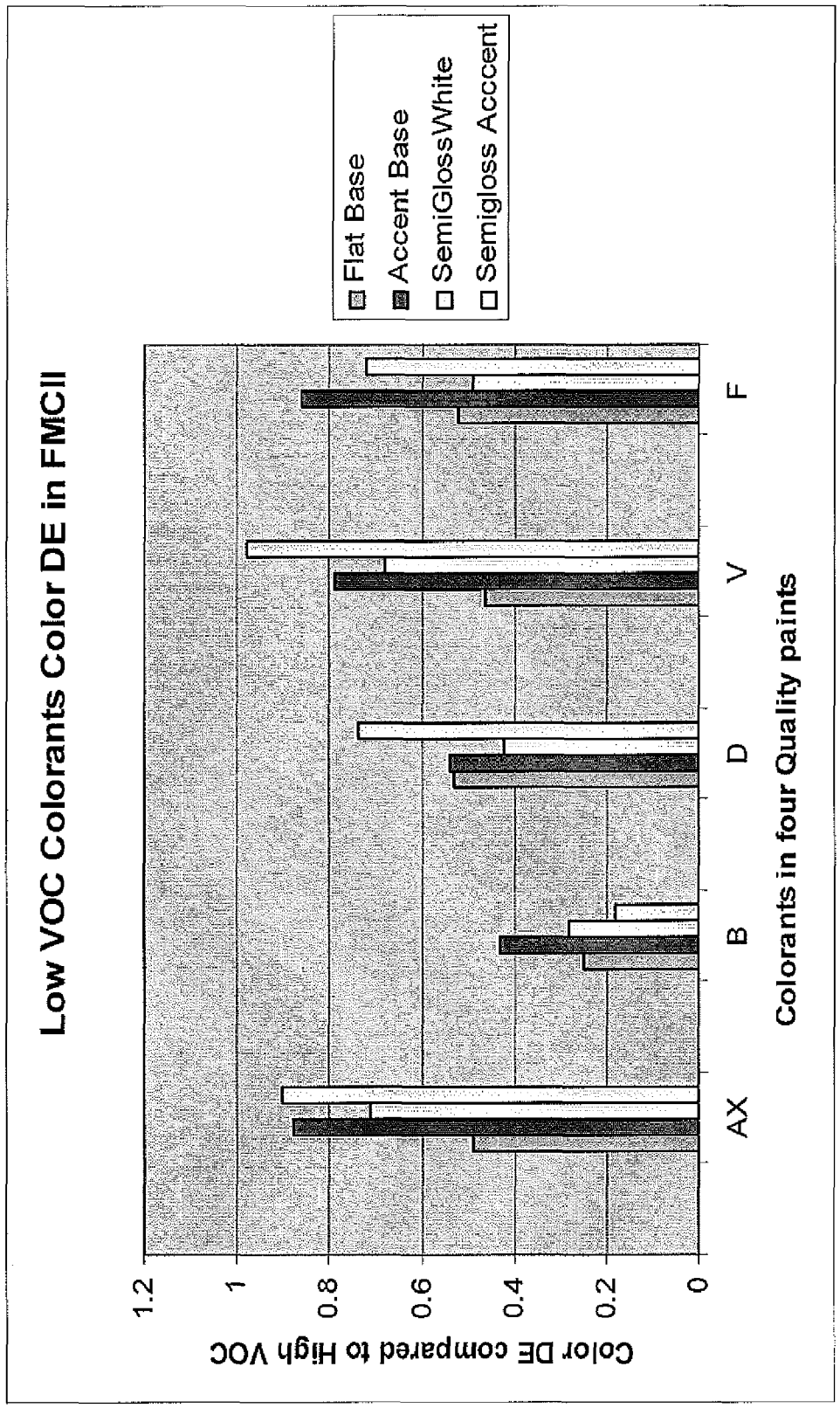
FIG. 1 is a bar graph showing color DE for exemplary low VOC colorant compositions compared to control tinters in different paint bases.

Unless defined otherwise, all technical and scientific terms used herein generally have the same meaning as commonly understood.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

The term "about" will be understood by persons of ordinary skill in is the art and will vary to some extent on the context in which it is used. Generally, "about" encompasses a range of values that are plus/minus 10% of a reference value. For instance, "about 25%" encompasses values from 22.5% to 27.5%.

It is understood that any and all whole or partial integers between any ranges set forth herein are included herein.

As used herein, "percent by weight" or "weight percent" or "% wt.," unless otherwise indicated, means weight percent based on the weight of a component as a percentage of the total colorant composition weight.

As used herein, "surface coating" refers to a film or a thin layer applied to a substrate for decorative or architectural purposes, which includes paint.

As used herein, "universal colorant" refers to a colorant that is compatible in surface coatings formed of either solvent-based alkyd emulsions or water-based latex emulsions.

As used herein, "point-of-sale colorant" or "point-of-sale tinting" refers to a colorant added to a surface coating at the time of purchase by a customer.

As used herein, "pigment," usually in the form of organic or inorganic dry powder, is a substance that imparts color to another substance or mixture. A "colorant" is also a substance that imparts color to another substance or mixture, and generally includes at least one pigment and other additives. "Dyes" and "tinting agents" similarly are color-imparting agents. A "metal effect agent" is an agent that imparts metallic-type luster and associated properties to paint films.

As used herein, "colorant component" refers to any of a pigment, colorant, tinting agent, dye, or metal effect agent.

As used herein, "particle size" refers to the diameter of a particle.

As used herein, "particle size distribution" refers to a set of values or a mathematical function that defines the relative amounts of particles present, sorted according to size.

As used herein, "chemically made" refers to a compound that is made outside of nature.

As used herein, "amino anchoring groups" refers to amino groups in a polyamide that provide affinity to other substances.

As used herein, "hydrophobic part" refers to a part of a compound that has little or no affinity for water.

As used herein, "water soluble" refers to a substance being capable of partially or completely dissolving in water.

As used herein, "multifunctional amines" refers to a plurality of amines that perform different functions.

As used herein, "phosphate ester" refers to an ester formed from phosphoric acid. "Phosphate ester" can also include any residual alcohol from the esterification process not separated from the ester.

As used herein, "alkali metal" refers to any element selected from the periodic table from the alkali metal group.

As used herein, "monoester," "diester," and "triester" refer to esters formed with one, two, or three esters, respectively.

As used herein, "coester" refers to a compound formed from a combination of esters.

As used herein, "aliphatic alcohol" refers to an alcohol that is not aromatic.

As used herein, "solvent-based alkyd surface coating" refers to a surface coating including a polymeric binder and a solvent. The polymeric binder can be a drying oil, natural, semi-synthetic or synthetic resin such as polyacrylate, polyurethane, modified alkyd resin or other film-forming polymer.

As used herein, "water-based latex surface coating" refers to a surface coating including a resin dispersion and water without a polymeric binder as used in solvent-based alkyd surface coatings.

As used herein, "pigment volume concentration" refers to the concentration on the basis of volume of pigments in a surface coating.

As used herein, "paint base" refers to the resin dispersion or polymeric binder used to hold the surface coating together and on the substrate.

As used herein, "extender" refers to a substance, which is usually white or slightly colored, and is used because of its physical or chemical properties. Extenders can have properties that impart certain desirable properties to the surface coating. Such desirable properties can include stabilization of the surface coating, prevention of sagging, making the surface coating matt, or improvement of the rheological properties of the surface coating. Additionally, extenders can be used to reduce the price of surface coatings.

As used herein, "modifier" refers to substances added to surface coatings to improve or change certain physical or chemical properties of the surface coating.

As used herein, "thickener" refers to substances which, when added to an aqueous mixture, increase its viscosity without substantially modifying its other properties. They provide body, increased stability, and/or improved suspension of added ingredients.

As used herein, "volatile organic compound (VOC)" refers to an organic chemical compound that has a vapor pressure of 0.01 kPa or more under normal conditions, including room temperature, or having a corresponding volatility under the particular condition of use.

As used herein, "VOC concentration" refers to the mass of VOC per volume of the total colorant composition.

As used herein, unless otherwise indicated, "substantially free" refers to a composition containing less than about 0.5% by weight of the indicated component in the total colorant composition.

As used herein, "hazardous air pollutants (HAPS)" refers to chemical compounds listed in section 112(b) of the Clean Air Act.

As used herein, "long-chain unsaturated fatty acid" refers to fatty acids containing at least one unsaturation and at least 16 carbons.

DESCRIPTION

For use in surface coatings, colorants are desired to possess consistent high performance of physical properties, such as Krebs units (KU) viscosity drop, ICI viscosity drop, block resistance, rub up, color float, pendulum hardness, scrub resistance, wet edge/dry to touch, stain removal, surfactant leach, alkyd adhesion sheen and mechanical stability. Additionally, high gloss generally is desired. Further for environmental reasons, consumers and government regulators desire very low to zero VOC colorants which are APE free and HAPS free. This combination of properties has proven difficult to accomplish.

Additionally, for ease of point-of-sale coloring, colorant compositions are typically dispensed into the surface coatings at time of purchase by the consumer. Dispensing of the colorant composition typically includes the use of a manual or automatic tint machine. Both machines, as well as, other dispensing devices have a dispensing nozzle, which retains some colorant composition after dispensing. Therefore, it is desired that the colorant composition has a non tip drying property so as to resist drying out within the dispensing nozzle.

Applicants have discovered a colorant composition with low to zero VOC with substantially equal to better performance than regular colorant compositions having higher VOC levels. The colorant composition further possesses a non tip drying property, and can be APE free and HAPS free.

According to one or more embodiments, a colorant composition includes a colorant component, a dispersant comprising a polyamide, a surface active agent, and water. Optionally, a colorant composition may also include other additives.

In a further embodiment, a colorant composition includes from about 5% to about 70% by weight colorant component, from about 1% to about 30% by weight dispersant, from about 0.1% to about 30% by weight surface active agent, and from about 1% to about 75% by weight water. When present, the optional additive(s) can be present at up to about 30% by weight.

In at least one exemplary embodiment, a colorant composition can have a VOC concentration of about 50 g/L or less. In a further embodiment, the VOC concentration can be from about 0.1 to about 50 g/L. In yet a further embodiment, the VOC concentration can be from about 0.1 to about 15 g/L. In yet a further embodiment, the VOC concentration can be 7 g/L or less.

In further exemplary embodiments, a colorant composition can be substantially free of alkylphenol ethoxylate (APE) surfactants. These surfactants are usually made from a branched-chain nonylphenol or octylphenol, which can be reacted with ethylene oxide. "Substantially free of APE" refers to a colorant composition having less than about 0.5% APE. In a further embodiment, the colorant composition can have less than about 0.1% APE. In yet a further embodiment, the colorant composition contains no APE.

In some embodiments, a colorant composition can be substantially free of hazardous air pollutants (HAPS). Substantially free of HAPS refers to a colorant composition having less than about 0.5% HAPS. In a further embodiment, the colorant composition will have less than about 0.1% HAPS. In yet a further embodiment, the colorant composition contains no HAPS.

Colorant Component

The colorant component includes any one or more of a pigment, colorant, tinting agent, dye, or metal effect agent. In many embodiments, the colorant component comprises at least one pigment with or without filler.

Exemplary pigments include both organic pigments and inorganic pigments. To cover the color hue and chroma of the entire color space, various combinations of pigments are used. For example, white pigments, black pigments, yellow pigments, orange pigments, red pigments, blue pigments, and green pigments can all be used. In further embodiments, the colorant component may contain combinations of the colored pigments. The combinations of the colored pigments may include at least two organic pigments, at least two inorganic pigments, or a combination of at least one organic pigment and at least one inorganic compound.

Exemplary colorant components producing colors listed above include: titanium dioxide (C I Pigment White 6), carbon black (C I Pigment Black 7), black iron oxide (C I Pigment Black 11), brown iron oxide (C Pigment Brown 7), yellow iron oxide (C I Pigment Yellow 42), bismuth vanadate (C I Pigment Yellow 184), azo yellow (C I Pigment Yellow 1), azo yellow (C I Pigment Yellow 3), azo yellow (C I Pigment Yellow 65), azo yellow (C I Pigment Yellow 74), diarylide yellow (C I Pigment Yellow 83), azo yellow (C I Pigment Yellow 97), benzimidazolone yellow (C I Pigment Yellow 194), disazopyrazolone orange (C I Pigment Orange 34), benzimidazolone orange (C I Pigment Orange 36), benzimidazolone orange (C I Pigment Orange 62), pyrazoloquinazolone orange (C I Pigment Orange 67), diketo-pyrrolopyrrole orange (C I Pigment Orange 73), red iron oxide (C I Pigment Red 101), quinacridone red (C I Pigment Red 122), quinacridone violet (C I Pigment Violet 19), naphthol red (C I Pigment Red 188), diketopyrrolopyrrol (DPP) red (C I Pigment Red 254), DPP red (C I Pigment Red 255), phthalocyanine blue (C I Pigment Blue 15:1), phthalocyanine blue (C I Pigment Blue 15:2), phthalocyanine blue (C I Pigment Blue 15:3), and phthalocyanine green (C I Pigment Green 7).

In an embodiment, the pigments are particulate. The pigment particles typically have a pigment particle size distribution with most of the pigment particle sizes in the range from about 0.1 to about 3 microns.

In embodiments where the colorant component includes filler, the filler can be colorless or colored. Typically, the filler can be colorless. Exemplary fillers are either natural or chemically made, and have a particle size in the range of from about 1 to about 300 microns. Examples of fillers that may be used include talc, barium sulfate, calcium carbonate, kaolin, attapulgite, magnesium carbonate, and calcined aluminosilicates, Some specific examples of fillers include NICRON 504 (talc available from Luzenac North America), BLANCFIXE (barium sulfate available from Solvay), OMYACARB (calcium carbonate available from Omya), and ATTAGEL (attapulgite available from BASF).

Dispersant

In at least one embodiment, the dispersant can be a polyamide. The polyamide includes at least two amino anchoring groups. The amino anchoring groups at least provide affinity for pigment surfaces. In further embodiments, the polyamide includes an unsaturated hydrophobic part of the chain. The unsaturation of the hydrophobic part at least provides cross linking properties in the presence of oxygen. In yet further embodiments, the polyamide can have a high molecular weight. Such polyamides at least provide improved compatibility with the pigment grinds for universal colorants. Universal colorants are colorants that are compatible with both solvent based and water based surface coverings. Further, such polyamides at least enable color acceptance without requiring low molecular weight APE surfactants.

In at least some embodiments, the polyamide includes a structure of formula (I) as provided below:

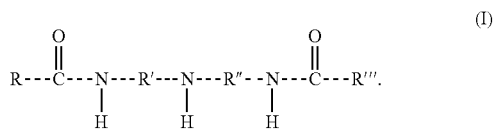

R, R', R", and R'" each can include alkyl, aryl, alkoxy, or substituted alkoxy groups, or fatty acid chains. Further, R, R', R", R'" can each be different from the other, some can be the same, or all can be the same.

The exemplary polyamide above includes three amino anchoring groups, but more can be included. An exemplary polyamide includes multifunctional amines, which improves the color stability of the colorant composition. In a further embodiment, the polyamide can be soluble in water.

In some embodiments, the polyamide is a fatty acid based polyamide. A fatty acid based polyamide is a polyamide containing fatty acid chains from fatty acids as at least some of the R groups. Exemplary fatty acids can include long-chain unsaturated fatty acids. Particular long-chain unsaturated fatty acids include at least 18 carbons. Specific examples include oleic and linoleic fatty acids.

In other embodiments, the polyamide includes an amine value of at least about 40 KOH/g. In a particular embodiment, the amine value is at least about 45 KOH/g. In a yet more particular embodiment, the amine value is about 45 to about 50 KOH/g. The polyamide may also include an acid value of at least about 25 KOH/g. In a particular embodiment, the acid value is at least about 35 KOH/g. In a further particular embodiment, the acid value is about 45 to about 50 KOH/g.

In a specific embodiment, the polyamide can have a molecular weight of at least 1500 g/mol. In a more particular embodiment, the molecular weight is at least 2500 g/mol. In yet a more particular embodiment, the molecular weight is from about 2500 to about 3000 g/mol. In a further embodiment, the molecular weight can be from about 2700 to about 2900 g/mol. In yet a further embodiment, the molecular weight can be about 2800 g/mol. Molecular weights in the above ranges can provide the polyamide with multifunctional amines.

The polyamide should be incorporated into the colorant composition at a pH from about 7.1 to about 9.4. In certain embodiments, the pH can be from 8 to about 8.5. The polyamide typically comprises from about 1 to about 30 weight percent of the colorant composition. In a specific embodiment, the polyamide can comprise about 4 to about 25% by weight of the colorant composition. In a particular embodiment, the polyamide can comprise about 5 to about 20% by weight of the colorant composition. In yet a more particular embodiment, the polyamide can comprise about 5 to about 15% by weight of the colorant composition.

Surface Active Agent

The surface active agent should improve the wetting of the pigments in the colorant composition, and should improve the stability of the colorant when used in combination with the polyamides of the dispersant. In many embodiments, the surface active agent includes no VOC. In some embodiments, the surface active agent can be phosphoric acid or phosphate ester. The phosphate ester may further include residual alcohol from the esterification process. In certain embodiments, the phosphate ester can be anionic or non-ionic, and forms a monoester, diester or triester. In certain embodiments, the surface active agent can be a phosphate coester of aliphatic alcohols. In specific embodiments, the phosphate coester can include a monoester/diester blend. In particular embodiments, the phosphate ester can be anionic, and can be a monoester or diester.

Examples of a phosphate monoester (formula II)) or phosphate diester (formula (III)) are provided below:

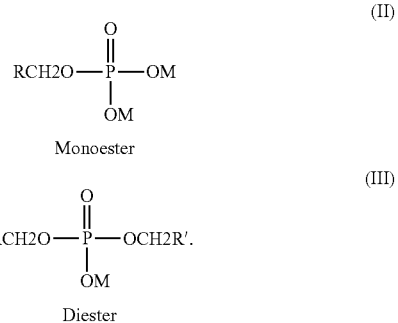

R and R' can each include hydrogen, alkyl, aryl, alkoxy, or substituted alkoxy. Further, R and R' can be different from each other or the same. In certain embodiments, R and R' can each include alkyl groups. In particular embodiments, R and R' can include isocetyl, octyl, tridecyl, or 2-phenyl heptyl. M can include, among other elements or functional groups, hydrogen, alkali metals, or ammonium. In certain embodiments, M includes potassium.

In other embodiments, the surface active agent can be a salt of phosphoric acid or a phosphate ester. Exemplary salts are formed with alkali metals or ammonium. In certain embodiments, the alkali metal can be potassium or sodium. In some embodiments, the phosphate esters or salts are APE free. In further embodiments, the phosphate esters are free of solvents like diethylene glycol (DEG), diethylene high gravity solvent (DE-HG), or isopropyl alcohol (IPA), which contribute to VOC.

The surface active agent typically comprises from about 0.1% to about 30% by weight of the colorant composition. In certain embodiments, the second surface active agent comprises from about 2% to about 20% by weight of the colorant composition. The particular amount selected can be dependent on the type of pigment and colorant used for the surface coating application. The particular amount selected may also depend on the amount of dispersant in the colorant composition. Colorant compositions with higher concentrations of dispersant may have lower concentrations of surface active agents.

Optional Additives

In some embodiments, the colorant composition includes additional additives besides the dispersant and surface active agent. Other additives are added to the colorant composition in an amount of about 30% or less of the total colorant composition.

Exemplary optional additives include polyethylene glycol, lecithin, polyoxyethylene fatty ethers, polyurethane polyols, thickeners, rheology modifiers, sodium salts of polycarboxylates, defoamers, and biocides. An exemplary lecithin is soya lecithin. Other optional additives include caustic and/or 2-amino-2-methyl-1-propanol (AMP) to affect the pH of the colorant composition.

The polyethylene glycol can be a humectant. Exemplary polyethylene glycol includes polyethylene glycol with molecular weights between about 300 g/mol and about 400 g/mol, including PEG 300 and PEG 400. PEG 300 or PEG 400 may also contribute to improved non-tip drying properties of the colorant composition. In specific embodiments, PEG 300 or PEG 400 comprises from about 1% to about 5% by weight of the colorant composition. In particular embodiments, PEG 300 comprises from about 1% to about 3% by weight of the colorant composition.

Exemplary Method for Forming a Colorant Composition

In one embodiment, the colorant composition can be made by grinding the pigment in a vertical sand mill. The exemplary media used in the mill for grinding includes 2 mm glass beads or zirconium oxide media of 0.8 to 1.25 mm. In another embodiment, similar media can be used in a horizontal mill. In certain embodiments, the colorant composition can be ground to a Hegman grind of 6. In some embodiments, the temperature of the grind can be kept at a temperature of from about 100° F. to about 110° F. A water cooling jacket may be used to keep the grind within the specified temperature range. In most embodiments, the colorant composition can be passed through the grinding mills one or two times. However, more passes may be needed to produce the desired colorant performance at a desirable flow rate.

Properties of Exemplary Colorant Compositions

For the low VOC colorant composition to be a substitute for regular VOC tinters for use in point-of-sale paints, the low VOC colorant compositions should contain the same or better levels of physical properties. Physical properties of paints that are typically measured include gloss, Krebs units (KU) viscosity drop, ICI viscosity drop, block resistance, rub up, color float, pendulum hardness, scrub resistance, wet edge/dry to touch, stain removal, surfactant leach, alkyd adhesion sheen and mechanical stability.

In specific embodiments, the gloss of the paint after addition of colorant compositions are considered. Gloss can at least be measured at three different angles, including 20°, 60°, and 85°. To meet consumer desires, semi-gloss paints measured at a 20° angle should have a gloss number of at least about 13. Current high VOC semi-gloss paints containing high VOC tinters have gloss numbers from about 13 to about 19. However, unexpectedly the exemplary low VOC colorant composition containing semi-gloss paints typically have improved gloss. In specific embodiments, when the exemplary low VOC colorant composition is added to a semi-gloss paint, the gloss number measured at a 20° angle is at least about 13. In more specific embodiments, the gloss number measured at a 20° angle is at least about 20. In yet more specific embodiments, the gloss number measured at a 20° angle is from about 21.5 to about 25.

Similarly, when measured at a 60° angle traditional quality semi-gloss paints include gloss numbers of at least about 45. In specific embodiments of exemplary low VOC colorant containing semi-gloss paints, the gloss number measured at a 60° angle is at least about 45. In more specific embodiments, the gloss number measured at a 60° angle is at least about 50. In yet more specific embodiments, the gloss number measured at a 60° angle is from about 54 to about 60.

In contrast, when the exemplary low VOC colorant compositions are added to flat bases where it is desired for the gloss to remain low, the gloss number measured at either 60° or 85° is less than about 1.5 gloss numbers higher than the gloss number for similar paints containing high VOC tinters. In specific embodiments, the gloss numbers are less than about 1 gloss number higher. In more specific embodiments, the gloss numbers are less than about 0.5 gloss number higher.

Another physical property that affects the desirability of a colorant composition is how much the viscosity drops for the paint when the colorant is added. If the viscosity drop is too high, the viscosity of the paint will be too low to be brushed or rolled onto a surface. Viscosity drop can be measured using Krebs Units (KU). For the paint to maintain a desired viscosity for brushing or rolling, the colorant composition should cause a viscosity drop in the range from about 75 KU to about 135 KU. In specific embodiments, the viscosity drop is in the range from about 90 KU to about 130 KU. In more specific embodiments, the viscosity drop is in the range from about 95 KU to about 120 KU.

Additionally, for point-of-sale coloring it is desired for the coloring composition to possess a non tip drying property so that the coloring composition continues to dispense at a desired rate over an extended time period without drying out. Non tip drying properties can be measured by comparing the percentage of mass of colorant per volume of colorant dispensed or the dispensing rate after a certain period of time to the percentage at an initial dispensing. In at least some embodiments, the exemplary low VOC colorant composition retains a dispensing rate after 14 days of dispensing without any purging within 10% of the initial dispensing rate. In specific embodiments, the dispensing rate after 14 days is within 7% of the initial dispensing rate. In more specific embodiments, the dispensing rate after 14 days is within 4% of the initial dispensing rate. In yet more specific embodiments, the dispensing rate after 14 days is within 1% of the initial dispensing rate. The dispensing tips when dispensing exemplary low VOC colorant compositions do not substantially dry even without additions of the traditional glycols that lead to the high VOC concentrations.

Surface Coverings Including a Colorant Composition

The colorant composition can be used in surface coverings to tint or provide the surface covering with a desired color. In particular embodiments, the surface coating can be a point-of-sale surface coating, meaning that the tint or color is added to the surface coating at the time the consumer purchases the coating. Point-of-sale tinting or coloring is typically used with interior and exterior paints. The colorant composition can be used in any paint bases from flat to high gloss. In certain embodiments, the paints have a pigment volume concentration from zero to about 85.

Most paints are made up of four basic groups of raw materials including 1) binders or resins; 2) pigments and/or colorants; 3) solvents; and 4) additives. When a paint is applied to a surface, the solvents evaporate while the binder, pigments, and additives remain on the surface to form a protective dry solid film. Up until the 1940's, paints were almost all solvent based. Today, more than 70% of the surface coatings market is water based paints due to its comparable performance and environmental regulations.

In particular embodiments, the colorant composition can be a universal colorant. Universal colorants are compatible with solvent-based alkyd surface coatings and water-based latex coatings. When using universal colorants, the same colorant composition can be used in a plurality of different paint bases. Exemplary paint bases, in which the colorant composition is compatible, include acrylic, styrene acrylic, polyvinyl acetate, ethylene vinyl acetate (EVA) type polymers, or alkyd. In certain embodiments, the alkyd paint bases include solvent- or water-reducible thickened alkyd. In further embodiments, the alkyd can be thickened using conventional, associative, or hybrid thickeners.

EXAMPLES

In the Examples 1-5 below, exemplary low VOC colorant compositions were made.

Example 1

Black Colorant

| Raw Materials | Parts by Weight |
|---|---|
| Water | 31.8 |
| Rheology Modifier | 1.7 |
| PEG 300 | 2.7 |
| NaOH (50%) | 0.5 |
| Polyamide B | 6.3 |
| Phosphate Ester C | 16.5 |
| Lecithin | 3 |
| Defoamer | 0.6 |
| Biocide | 0.3 |
| C I Pigment Black 7 | 8.6 |
| Extender | 28 |
| Total | 100 |

Example 2

Green Colorant

| Raw Materials | Parts by Weight |
|---|---|
| Water | 31.1 |
| PEG 300 | 1.7 |
| NaOH (50%) | 0.5 |
| Polyamide B | 4.7 |
| Phosphate Ester C | 16.9 |
| Lecithin | 2.6 |
| Defoamer | 0.6 |
| Biocide | 0.3 |
| C I Pigment Green 7 | 9.6 |
| Extender | 32 |
| Total | 100 |

Example 3

Magenta Colorant

| Raw Materials | Parts by Weight |
|---|---|
| Water | 41.9 |
| PEG 300 | 1.7 |
| NaOH (50%) | 0.5 |
| Polyamide B | 4.5 |
| Phosphate Ester C | 16.2 |
| Lecithin | 2.7 |
| Defoamer | 0.5 |
| Biocide | 0.3 |
| C I Pigment Red 122 | 9.7 |
| Extender | 22 |
| Total | 100 |

Example 4

Yellow Colorant

| Raw Materials | Parts by Weight |
|---|---|
| Water | 32 |
| PEG 300 | 1.1 |
| NaOH (50%) | 0.5 |
| Polyamide B | 6.5 |
| Phosphate Ester C | 12 |
| Maleic Anyhdride Copolymer Sodium Salt | 1 |
| Defoamer | 0.5 |
| Biocide | 0.3 |
| C I Pigment Yellow 74 | 37.2 |
| Extender | 8.9 |
| Total | 100 |

Example 5

Red Colorant

| Raw Materials | Parts by Weight |
|---|---|
| Water | 21.1 |
| PEG 300 | 2 |
| NaOH (50%) | 0.5 |
| Polyamide B | 13.1 |
| Phosphate Ester C | 4 |
| Maleic Anyhdride Copolymer Sodium Salt | 1 |
| Rheology Modifier | 1.5 |
| Defoamer | 0.5 |
| Biocide | 0.3 |
| C I Pigment Red 101 | 53 |
| Extender | 3 |
| Total | 100 |

In Comparative Examples A-E, regular VOC tinters containing the five pigments in the same concentrations as the exemplary examples 1-5, respectively, were made.

Comparative Example A

Black Colorant

| Raw Materials | Parts by Weight |
|---|---|
| Water | 22 |
| DiEthylene Glycol | 34 |
| APE | 4.5 |
| Isopropylamine sulfonate | 2.5 |
| AMP 95 | 0.5 |
| Defoamer | 0.5 |
| C I Pigment Black 7 | 8.6 |
| Extender | 27.4 |
| Total | 100 |

Comparative Example B

Green Colorant

| Raw Materials | Parts by Weight |
|---|---|
| Water | 30 |
| Ethylene Glycol | 17 |
| APE | 3.5 |
| Lecithin | 2.0 |
| AMP 95 | 0.5 |
| Defoamer | 0.5 |
| Nonionic Surfactant | 0.5 |
| C I Pigment Green 7 | 9.6 |
| Extender | 36.4 |
| Total | 100 |

Comparative Example C

Magenta Colorant

| Raw Materials | Parts by Weight |
|---|---|
| Water | 21 |
| DiEthylene Glycol | 48 |
| APE | 3.5 |
| Styrene maleic copolymer | 2.0 |
| Isopropylamine sulfonate | 0.5 |
| AMP 95 | 0.5 |
| Defoamer | 0.5 |
| C I Pigment Red 122 | 9.7 |
| Extender | 14.3 |
| Total | 100 |

Comparative Example D

Yellow Colorant

| Raw Materials | Parts by Weight |
|---|---|
| Water | 25 |
| DiEthylene Glycol | 10 |
| APE | 3.5 |
| Styrene maleic copolymer | 1.0 |
| Lecithin | 3.0 |
| Ethylene Glycol | 10.4 |
| AMP 95 | 0.5 |
| Defoamer | 0.5 |
| C I Pigment Yellow 74 | 37.2 |
| Extender | 8.9 |
| Total | 100 |

Comparative Example E

Red Oxide Colorant

| Raw Materials | Parts by Weight |
|---|---|
| Water | 10.5 |
| DiEthylene Glycol | 14 |

-continued

| Raw Materials | Parts by Weight |
|---|---|
| Ethylene Glycol | 10.6 |
| APE | 3.7 |
| Styrene maleic copolymer | 1.7 |
| Isopropylamine sulfonate | 1.5 |
| AMP 95 | 0.5 |
| Defoamer | 0.5 |
| Nonionic Surfactant | 0.5 |
| C I Pigment Red 101 | 53 |
| Extender | 3.5 |
| Total | 100 |

The KU and ICI viscosity were determined using Brookfield and ICI viscometer, respectively. The storage stability of all the low VOC colorants were determined at 50° C. for 14 days and found to be stable in the oven test. The color results were read in CIE Lab and/or in FMC-II. CIE Lab refers to the color difference equations based upon the CIE Lab Color Space established by CIE (International Commission on Illumination) in 1976. FMC-II refers to the color difference equations based upon the CIE Color Space devised by Friele, MacAdam, and Chickering in 1943. The color readings can be recorded in a datacolor spectrophotometer. The scrub and pendulum hardness were tested in Paul Gardner and BYK Gardner instruments, respectively.

Tinted paints were prepared using flat and semi gloss bases; high gloss base was also used in the assessment of pendulum hardness. After the colorant composition was made and dispersed in paint bases, the physical properties were measured. The physical properties of the low VOC colorant composition were compared with the existing regular VOC tinters, which are labeled as Options®, which are colorants produced by BASF. In the figures, "control" refers to regular high VOC tinters, while "APEO free/Low VOC" refers to exemplary low VOC and APE surfactant free colorant compositions, Regular high VOC tinters include tinters having VOC concentrations of about 250 to about 500 g/L.

Colorant compositions were made using a low/no VOC formula from Examples 1-5. The colorant compositions of Examples 1-5 form five colors: B (black), D (phthalo green), V (magenta), AX (greenish yellow), and F (iron oxide red), respectively. Further, colorant compositions similar to Examples 1-5 were used to form seven other colors: C (iron oxide yellow), E (phthalo blue), I (iron oxide brown), KX (white), L (raw umber), R (organic red), and T (medium yellow). Traditional colorant compositions having high VOC concentrations were prepared in Comparative Examples A-E. The colorant compositions of Comparative Examples A-E form five colors: B (black), D (phthalo green), V (magenta), AX (greenish yellow), and F (iron oxide red), respectively. The pigments to form the above colors were added in the same concentrations as the pigments were added to the colorant compositions of Examples 1-5. Further, colorant compositions similar to Comparative Examples A-E were used to form seven other colors: C (iron oxide yellow), E (phthalo blue), I (iron oxide brown), KX (white), L (raw umber), R (organic red), and T (medium yellow).

In FIG. 1, the color ΔE's for paints containing colorant compositions according to Examples 1-5 in four different bases are presented. The bases are four different interior enamel acrylic latex do-it-yourself paints. The bases are: flat ultrapure, flat accent, semi gloss pure white, and semi gloss accent. Color ΔE (DE) is a measure of the color difference between two paints. In this case, the DE between paints containing exemplary low VOC colorant compositions according to Examples 1-5 and high VOC tinters according to Comparative Examples A-E, which have between about 250 and 500 g/L VOC. These values were measured using FMC-II, wherein any value less than equal to 1.0 is a color difference that is substantially indistinguishable by the naked eye in chroma, hue and lightness. As illustrated in FIG. 1, each of the five example colorant compositions in each to of the four different bases had a DE value less than 1.0. FIG. 1 shows the linearity of the new low VOC colorants to the existing high VOC ones. The new and existing colorants are very close in chroma, hue, and lightness with DE<=1. Therefore, consumers would experience no degradation in color quality when using the low or no VOC colorant compositions according to embodiments of this invention compared to the currently available high VOC colorant tinters such as Options®, produced by BASF.

In FIGS. 2-5 and 7-10, the control average was the average of the values for the regular high VOC tinters containing the same twelve pigments used for the twelve exemplary colorant compositions described above, of which five pigments were according to Comparative Examples A-E. The APEO free/low VOC average was the average of the values for the twelve colorant compositions according to the examples.

Figure 2:
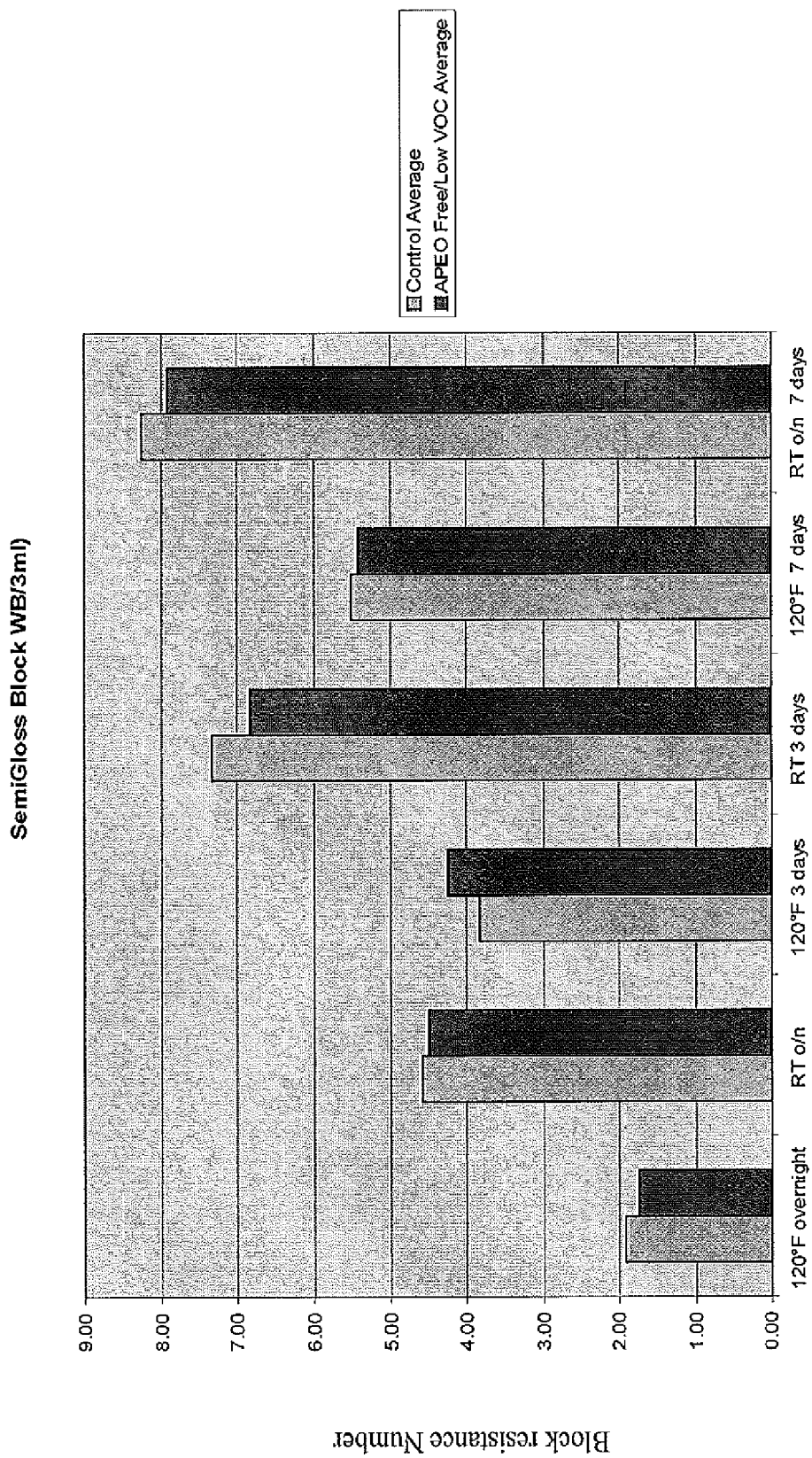
FIG. 2 is a bar graph showing block resistance averages for exemplary low VOC colorant compositions compared to control tinters in semi gloss paint.

FIG. 2 shows block resistance for semi gloss paints. Block resistance is the ability for the paints to be separated. The block resistance number is determined using the standard ASTM D 4946 test method that includes cutting pieces of dry paint, putting the pieces together, and measuring how they pull apart after a certain time period. In FIG. 2, the control average and APEO Free/Low VOC average block resistance was compared for room temperature and at 120° F. over periods of overnight, three days, and seven days. As illustrated in FIG. 2, the exemplary colorant compositions had a block resistance within one block resistance number of the high VOC tinters. Values within one block resistance number are within tolerance and consumers would not recognize any substantial difference.

Figure 3:
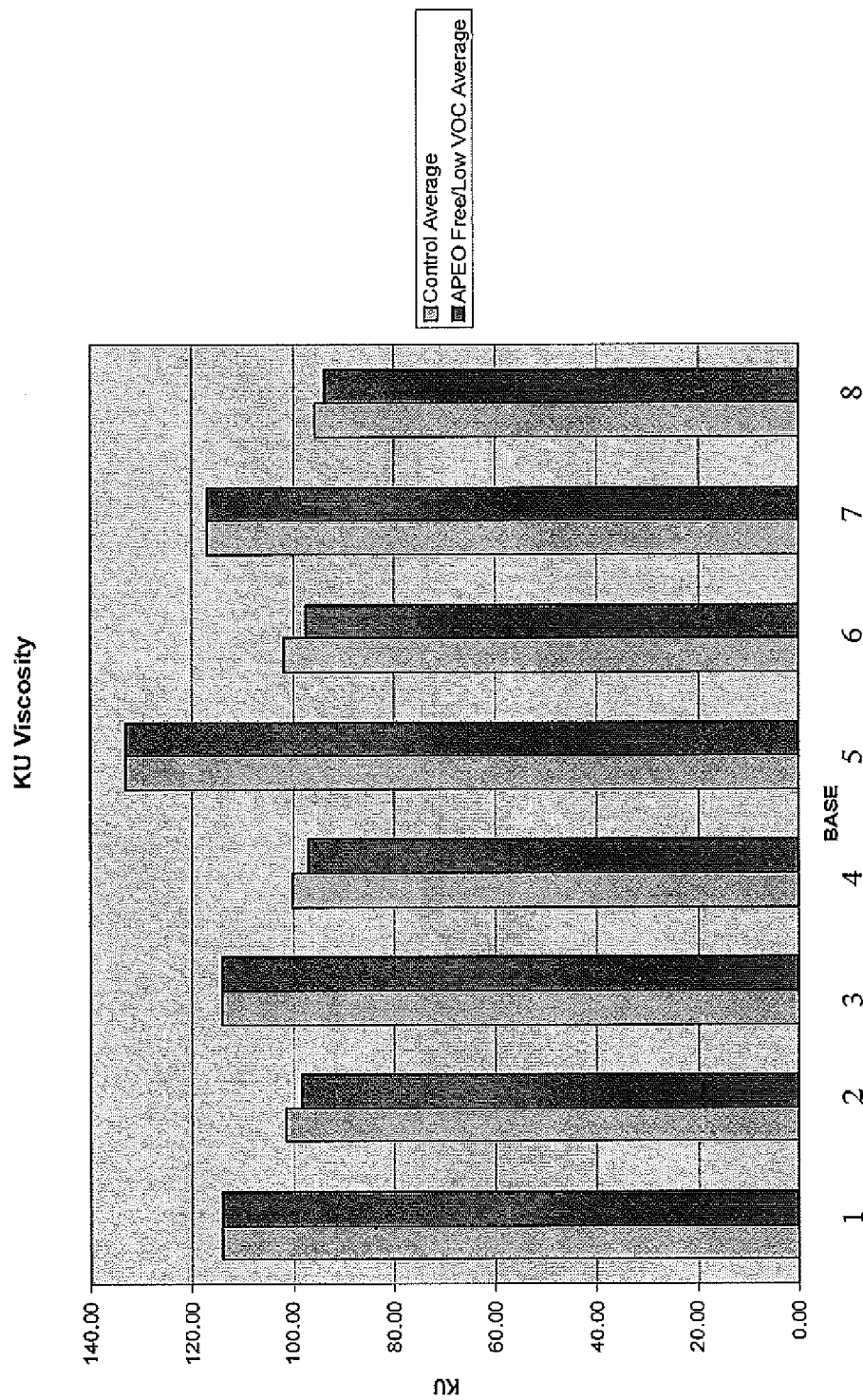
FIG. 3 is a bar graph showing KU viscosity averages for exemplary low VOC colorant compositions compared to control tinters in a variety of paint bases.

FIG. 3 shows Krebs Units (KU) viscosity data for paint bases 1-8. Paint base 1 was an interior flat pastel base. Paint base 2 was 6 oz colorant loading interior flat pastel base. Paint base 3 was a low VOC interior flat pastel base. Paint base 4 was a 6 oz colorant loading low VOC interior flat pastel base. Paint base 5 was a semi gloss accent base. Paint base 6 was a 12 oz colorant loading semi gloss accent base. Paint base 7 was a low VOC semi gloss accent base. Paint base 8 was a 12 oz colorant loading low VOC semi gloss accent base. KU viscosity is the viscosity measured in Krebs Units using a Krebs Unit viscometer. It is desired that a colorant composition not cause a large viscosity drop of the paint when added. If the colorant composition lowers the viscosity of the paint too much, it becomes difficult to paint with brushes and rollers. As illustrated in FIG. 3, KU viscosity averages for the control examples and the exemplary colorant compositions were within a 4% difference, which would not be a substantial difference to consumers.

Figure 4:
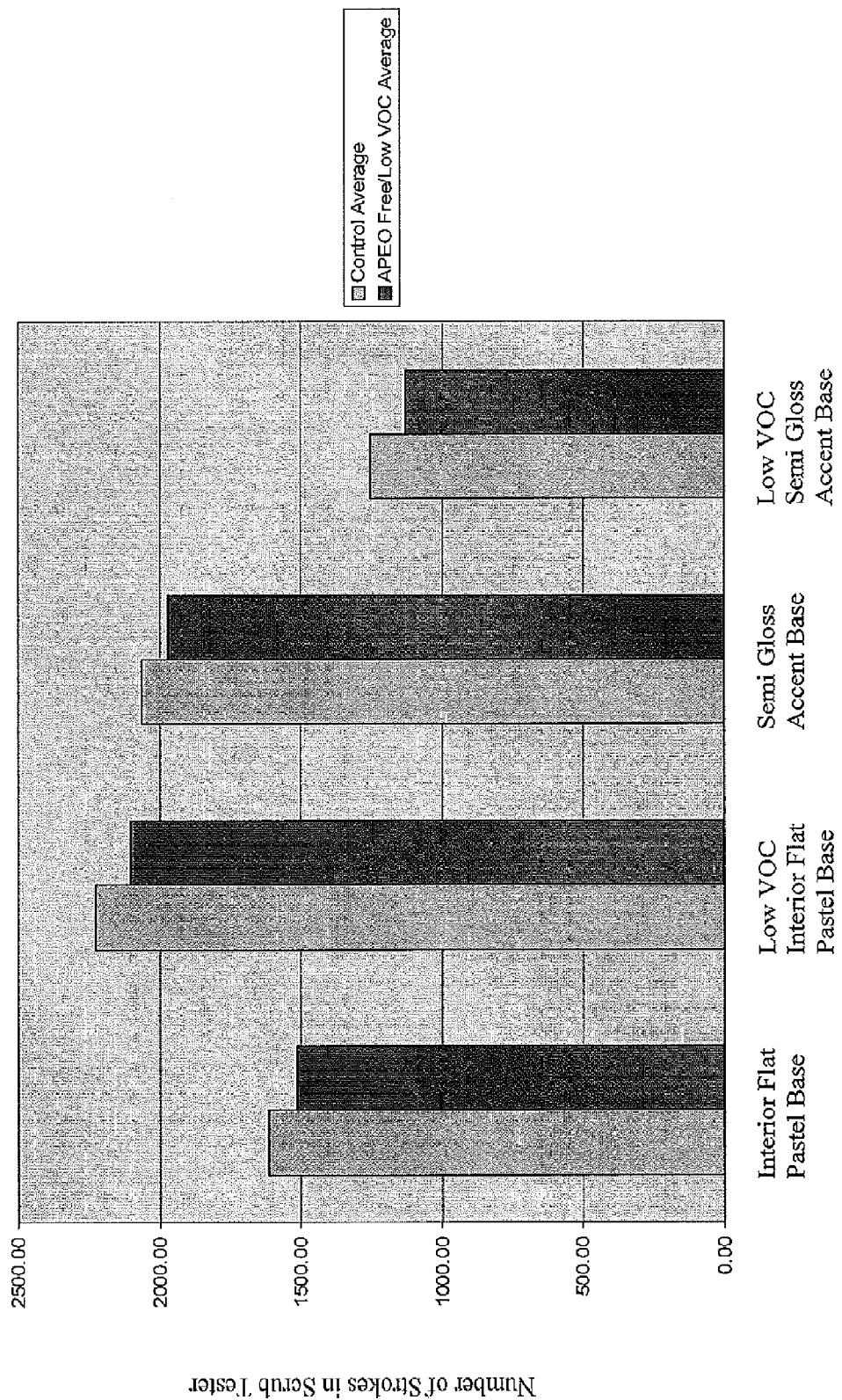
FIG. 4 is a bar graph showing scrub resistance averages for exemplary low VOC colorant compositions compared to control tinters in a variety of paint bases.

FIG. 4 shows scrub resistance average results for the addition of the control high VOC colorants and the addition of the exemplary colorant compositions to four bases. The four bases tested included a regular VOC interior flat pastel base, a low VOC interior flat pastel base, a regular VOC semi gloss accent base, and a low VOC semi gloss accent base. Scrub resistance is the ability of the paint to prevent damage by being rubbed by brushing objects. As illustrated in FIG. 4, the number of strokes in the scrub tester that each base containing a control average and exemplary embodiment average was within about 10% difference. Less than 10% difference in number of strokes would not be noticeable to consumers.

Figure 5:
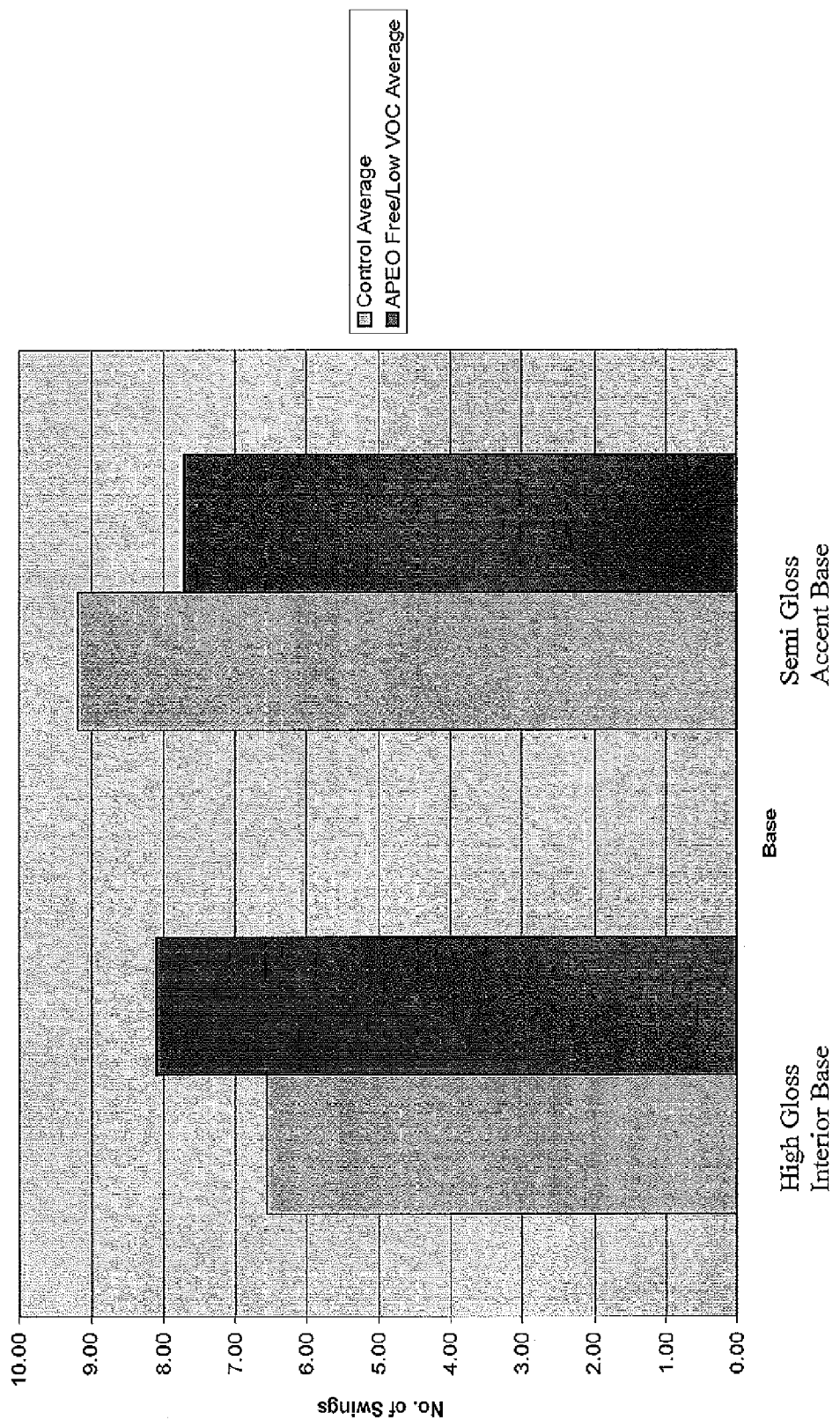
FIG. 5 is a bar graph showing pendulum hardness averages for exemplary low VOC colorant compositions compared to control tinters in a variety of paint bases.

FIG. 5 shows pendulum hardness data for high gloss paint and semi gloss paint. A pendulum hardness test provides data regarding the hardness of paint by swinging a pendulum at a coated surface. Any swing values within two swings would not be noticeable to potential consumers. As illustrated in FIG. 5, the pendulum hardness average for exemplary embodiments was actually better than the pendulum hardness average for control examples of colorant compositions applied to a high gloss interior base. Although the pendulum hardness average for exemplary embodiments when added to a semi gloss accent base was less than the hardness for the control examples, it was still within the two swing margin.

Figure 6:
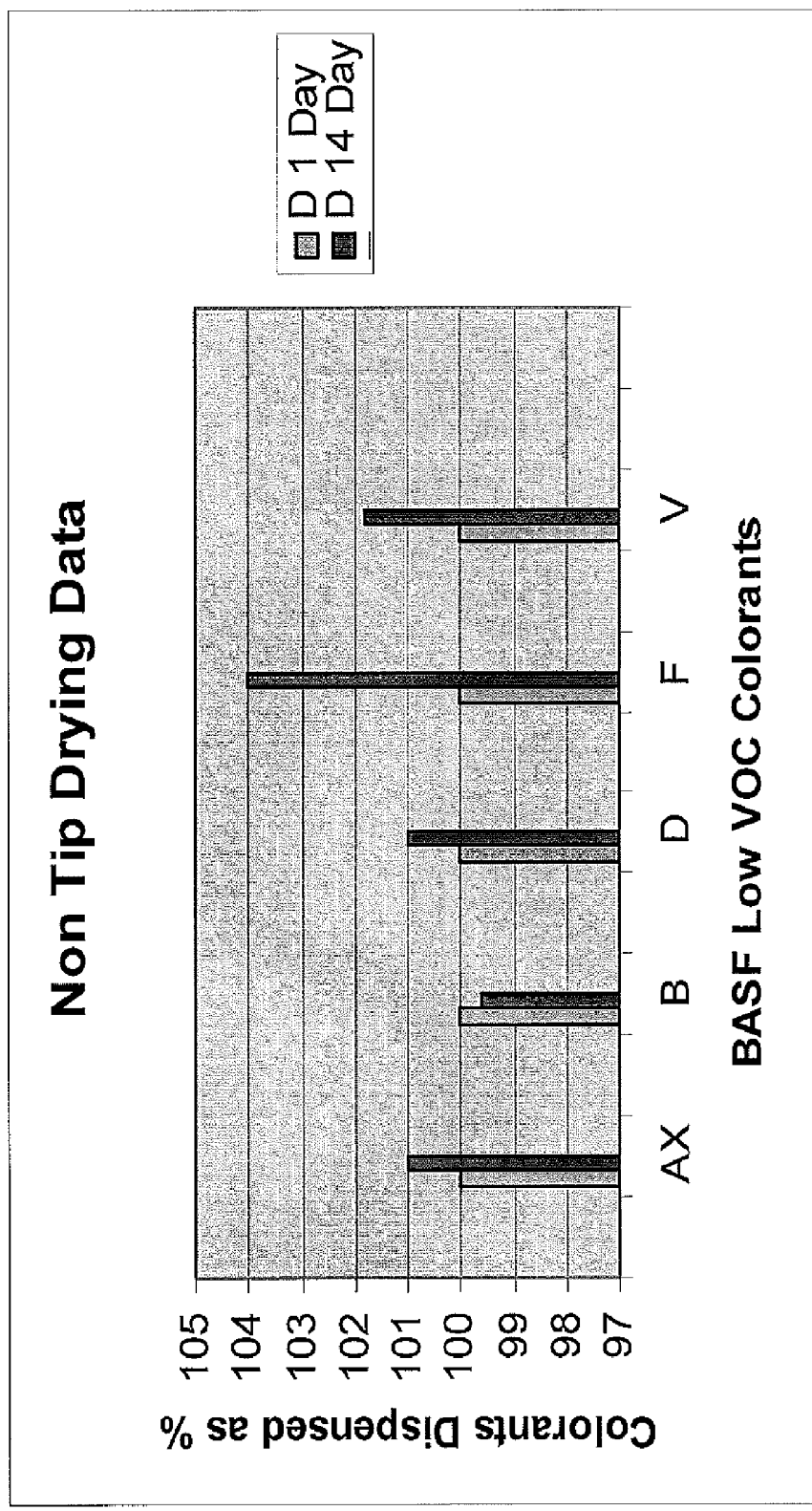
FIG. 6 is a bar graph showing non tip drying properties at two different time periods for five different low VOC colorants.

FIG. 6 shows the non tip drying properties of the colorant compositions of Examples 1-5. In point of sale colorants, the colorant compositions are added to paint bases by dispensing, usually from an automatic machine, the amount of colorants required for a desired color. If the colorant dries in the dispenser, then the correct amount of colorant is not dispensed and the color is likely incorrect. Therefore, point of sale colorants are desired to include non tip drying properties. Ultimately it is desired to achieve similar amounts of colorant dispensed from the initial dispensing to dispensing at least 14 days later even without purging the tips during that time period.

To test the non tip drying properties of the colorant compositions of Examples 1-5, the exemplary colorant compositions were put into a typical automatic dispensing machine for tinters available in the industry from various manufacturers. Unlike typical high VOC tinters (200-500 g/L), the colorant compositions were put in the machine without any ethylene glycol or diethylene glycol. One ounce of the colorant composition was dispensed once a week for four to six weeks to check the robustness of the non tip drying capability of the colorant compositions. The graph in FIG. 6 shows the results obtained with the colorants dispensed at the beginning and at 14 days after the beginning. No daily purging was performed. Some dispensing machines use humidifiers or other special devices to achieve non tip drying and this new formulation development enables the non tip drying without such assistance.

In another non tip drying test, low VOC F from Example 5 was taken as a reference point. Three grams of colorant composition were placed on a lid and left overnight at room temperature. The next morning, the colorant composition was checked for moistness and mobility by applying light pressure with a finger. The colorant composition passed if the next morning the colorant composition was moist and movable with a finger, and failed if the colorant composition was not movable when pressure is applied. Colorant compositions passing this test not only provide non tip drying in automatic dispensing machines, but also prevent drying out for small paint stores that do not use dispensing machines.

Figure 7:
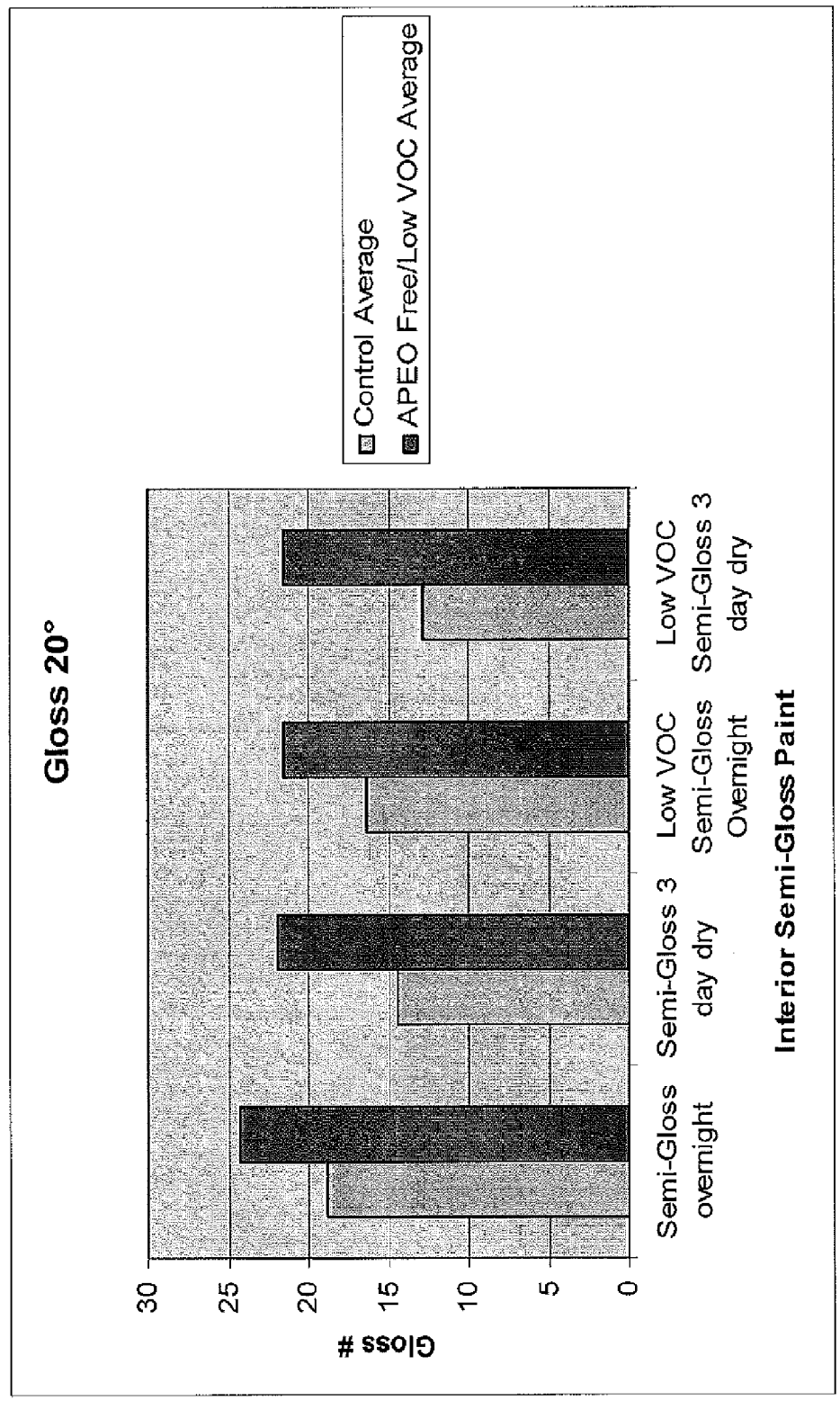
FIG. 7 is a bar graph showing gloss number averages measured at 20° angle for exemplary low VOC colorant compositions compared to control tinters in semi-gloss paints after two different drying times.
Figure 8:
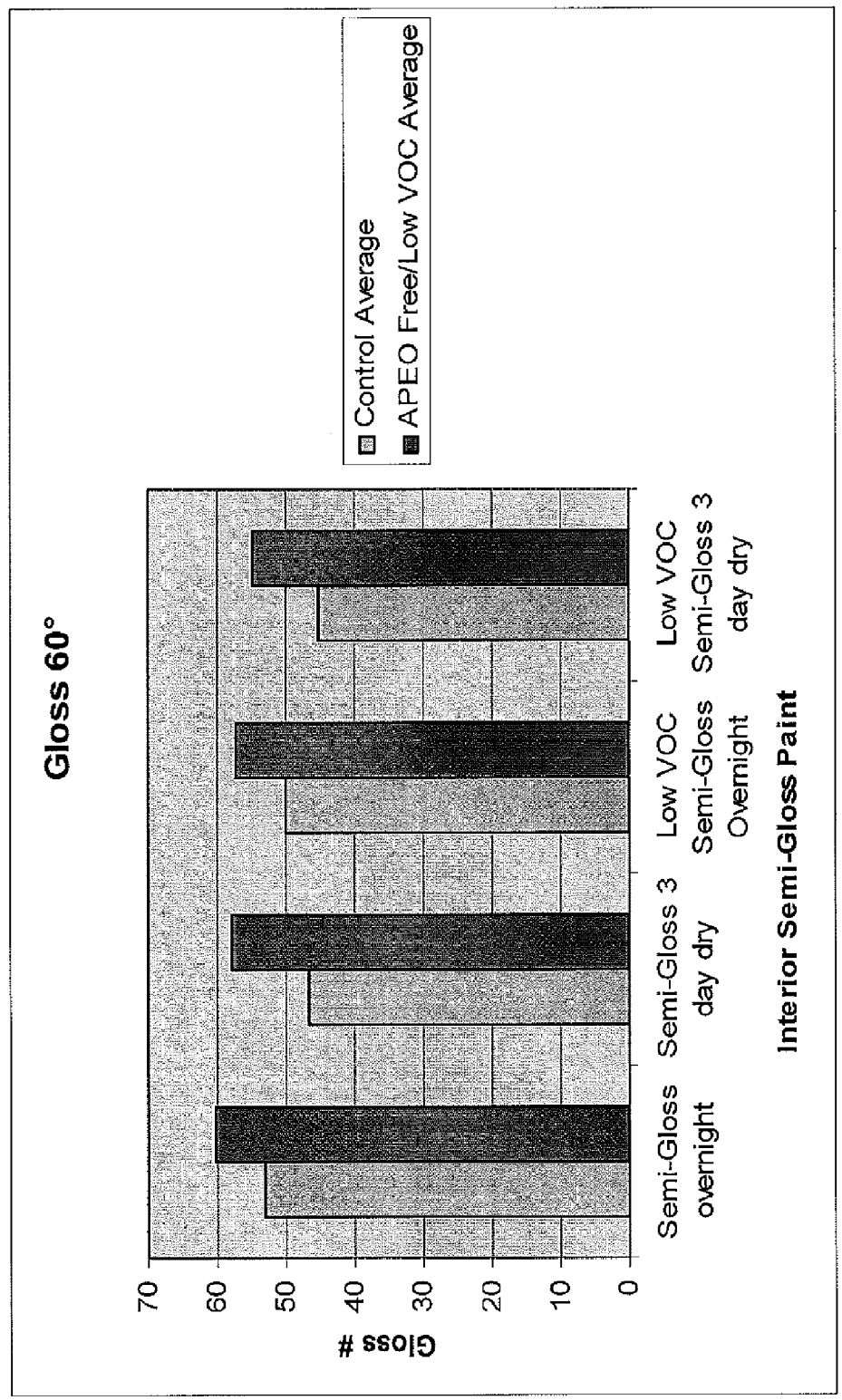
FIG. 8 is a bar graph showing gloss number averages measured at 60° angle for exemplary low VOC colorant compositions compared to control tinters in semi-gloss paints after two different drying times.
Figure 9:
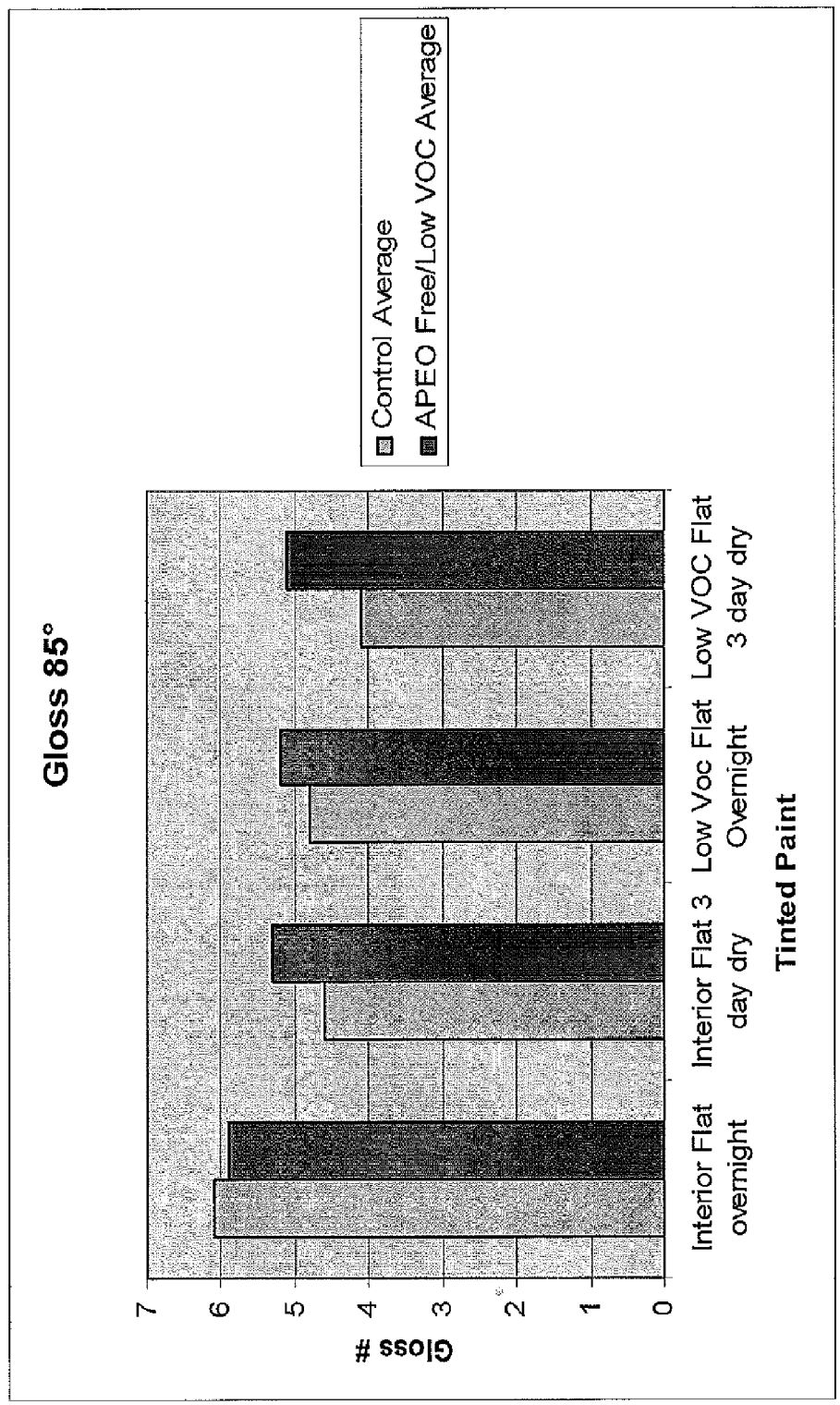
FIG. 9 is a bar graph showing gloss number averages measured at 85° angle for exemplary low VOC colorant compositions compared to control tinters in flat paints after two different drying times.
Figure 10:
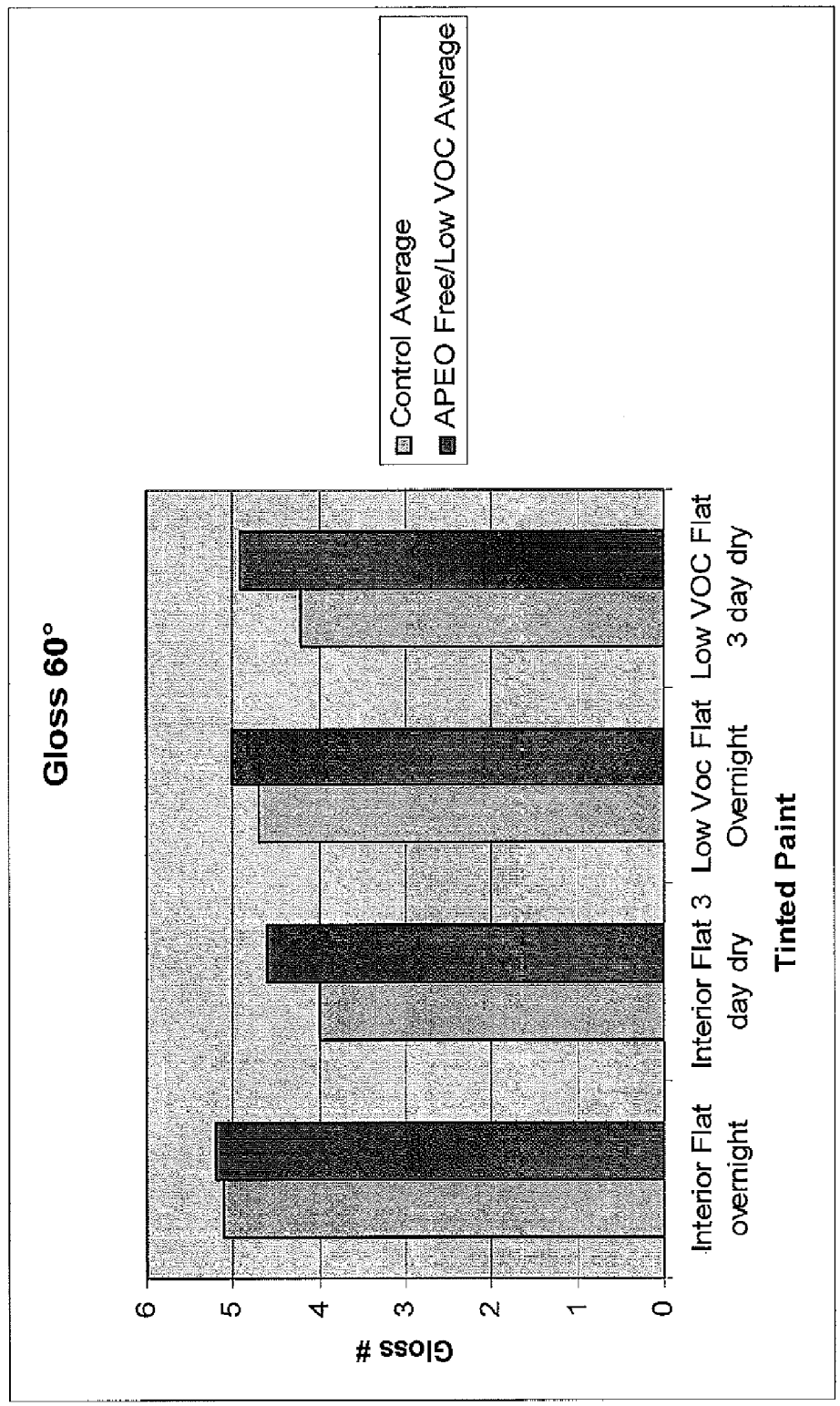
FIG. 10 is a bar graph showing gloss number averages measured at 60° angle for exemplary low VOC colorant compositions compared to control tinters in flat paints after two different drying times.

FIGS. 7-10 show gloss number averages for paints containing additions of exemplary low VOC colorant compositions compared to gloss number averages for high VOC tinters. In FIGS. 7-8, the exemplary low VOC colorant compositions and high VOC tinters were added to a regular semi-gloss base and a low VOC semi-gloss base. The gloss numbers were measured for each prepared paint after drying overnight and again after drying for three days at a 20° angle for the results in FIG. 7 and at a 60° angle for the results in FIG. 8. As illustrated in FIGS. 7 and 8, the exemplary low VOC colorant composition containing paints possessed better gloss numbers than the regular VOC tinters, especially at the 20° angle measurement, In FIGS. 9-10, the exemplary low VOC colorant compositions and regular VOC tinters were added to a regular interior flat base and a low VOC interior flat base. The gloss number were measured for each prepared paint after drying overnight and again after drying for three days at a 85° angle for the results in FIG. 9 and at a 60° angle for the results in FIG. 10. FIGS. 9-10 illustrate that the exemplary low VOC colorant composition containing paints possessed substantially the same gloss numbers than the regular VOC tinters.

All cited patents and publications referred to in this application are herein incorporated by reference in their entirety for all purposes.

Although described in connection with embodiments thereof, it will be appreciated by those skilled in the art that additions, deletions, modifications, and substitutions not specifically described herein or in the examples above, may be made without departure from the spirit and scope of the articles and methods set forth in the appended claims.

What is claimed:

1. A colorant composition comprising:
a colorant component;
a dispersant comprising a compound of formula (I):

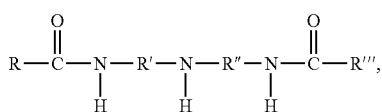

wherein R and R''' are each independently selected from the group consisting of fatty acid chains comprising at least 16 carbons and at least one unsaturation, and
wherein R' and R'' are each independently selected from the group consisting of divalent alkane and divalent arene;
a surface active agent comprising a phosphate ester or salt thereof,
wherein the phosphate ester is a monoester of formula (II)

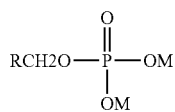

or diester of formula (III)

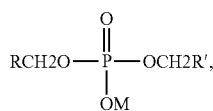

or combination thereof,
wherein R and R' of the phosphate ester are each independently selected from the group consisting of isocety, octyl, tridecyl, or 2-phenyl heptyl; and
wherein M is hydrogen, an alkali metal, or ammonium;
water; and
optionally an additive.

2. A colorant composition of claim 1 comprising:
from about 5 to about 70% by weight of the colorant component;
from about 1 to about 30% by weight of the dispersant;
from about 0.1 to about 30% by weight of the surface active agent;
from about 1 to about 75% by weight water; and
from about 0 to about 30% by weight of the additive.

3. The colorant composition of claim 1, wherein the colorant composition is non tip drying wherein a dispensing rate after at least 14 days of dispensing one ounce of the colorant composition once a week is within 10% of an initial dispensing rate.

4. The colorant composition of claim 1, wherein a gloss number measured at a 20° angle is at least 13 for a semi-gloss paint comprising said colorant composition.

5. The colorant composition of claim 1, wherein the colorant component comprises a pigment and a filler.

6. The colorant composition of claim 5, wherein the filler has a particle size from about 1 to about 300 microns.

7. The colorant composition of claim 5, wherein the filler includes one or more of talc, barium sulfate, calcium carbonate, kaolin, attapulgite, magnesium carbonate, and calcined aluminosilicates.

8. The colorant composition of claim 1, wherein the compound of formula (I) has a molecular weight from 1500 g/mol to 2900 g/mol.

9. The colorant composition of claim 1, wherein the compound of formula (I) comprises a fatty acid chain having at least 18 carbons.

10. The colorant composition of claim 1, wherein the surface active agent comprises an alkali metal or ammonium salt of the phosphate ester.

11. The colorant composition of claim 1, wherein the colorant composition is compatible with solvent-based alkyd surface coatings and water-based latex surface coatings.

12. The colorant composition of claim 1, wherein the colorant composition is substantially free of alkylphenol ethoxylate (APE) surfactants.

13. The colorant composition of claim 1, wherein the compound of formula (I) has an amine value of about 45 KOH/g to about 50 KOH/g and an acid value of about 45 KOH/g to about 50 KOH/g.

14. A colorant composition comprising:
a colorant component;
a dispersant comprising a compound of formula (I):

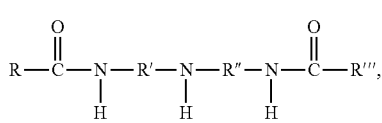

wherein R and R''' are each independently selected from the group consisting of fatty acid chains comprising at least 16 carbons and at least one unsaturation,
wherein R' and R'' are each independently selected from the group consisting of divalent alkane and divalent arene, and
a surface active agent comprising a phosphate ester or phosphoric acid, or salts thereof;
water; and
an additive selected from the group consisting of polyethylene glycol, lecithin, polyoxyethylene fatty ethers, polyurethane polyols, thickener, rheology modifier, sodium salt of polycarboxylates, defoamers, extender, biocides, and combinations thereof.

15. The colorant composition of claim 14, wherein the one or more additives includes polyethylene glycol having a molecular weight between about 300 and about 400 g/mol.

16. A colorant composition comprising:
a colorant component;
a dispersant comprising a compound of formula (I):

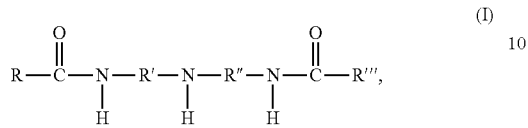

wherein R and R''' are each independently selected from the group consisting of fatty acid chains comprising at least 16 carbons and at least one unsaturation,
wherein R' and R'' are each independently selected from the group consisting of divalent alkane and divalent arene, and
a surface active agent comprising a phosphate ester or phosphoric acid, or salts thereof;
water; and
optionally an additive,
wherein the colorant composition comprises a volatile organic compound (VOC) concentration of about 50 g/L or less.

17. The colorant composition of claim 16, wherein the colorant composition comprises a VOC concentration of from about 0.1 to about 15 g/L.

* * * * *